United States Patent
Smith (10) Patent No.: US 10,512,583 B2
(45) Date of Patent: Dec. 24, 2019

(54) FORWARD OR REARWARD ORIENTED EXOSKELETON

(71) Applicant: Sarcos LC, Salt Lake City, UT (US)

(72) Inventor: Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 999 days.

(21) Appl. No.: 14/704,964

(22) Filed: May 5, 2015

(65) Prior Publication Data

US 2015/0321341 A1 Nov. 12, 2015

Related U.S. Application Data (60) Provisional application No. 61/989,521, filed on May 6, 2014.

(51) Int. Cl.
  *A61H 1/02* (2006.01)
  *A61H 3/00* (2006.01)
  *B25J 9/00* (2006.01)

(52) U.S. Cl.
  CPC .............. *A61H 3/00* (2013.01); *A61H 1/024* (2013.01); *A61H 1/0237* (2013.01);
  (Continued)

(58) Field of Classification Search
  CPC .. A61H 1/0244; A61H 1/0262; A61H 1/0266; A61H 1/0274; A61H 1/0281; A61H 1/0285; A61H 1/0237; A61H 2001/0245; A61H 2001/0251; A61H 3/00; A61H 3/008; A61H 2003/007; A61H 1/024; A61H 1/0255; A61H 1/0259; A61H 1/0277
  See application file for complete search history.

(56) References Cited

U.S. PATENT DOCUMENTS

| 2,981,198 A | 4/1961 | Nettel |
| 3,358,678 A | 12/1967 | Kulstar |

(Continued)

FOREIGN PATENT DOCUMENTS

| CN | 103610524 A | 3/2014 |
| DE | 102010029088 A1 | 11/2011 |

(Continued)

OTHER PUBLICATIONS

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

(Continued)

*Primary Examiner* — Valerie L Woodward (57) ABSTRACT

An exoskeleton is disclosed. The exoskeleton can include support members rotatably coupled together about a joint. The joint can define a degree of freedom, which can correspond to a degree of freedom of a human extremity, such as hip medial/lateral rotation, ankle medial/lateral rotation, shoulder medial/lateral rotation, or wrist pronation/supination rotation. One or more parasagittal planes through the human extremity can intersect the joint to minimize a gravity-induced moment on the first joint during operation of the exoskeleton.

29 Claims, 5 Drawing Sheets

(52) U.S. Cl.
CPC ......... *A61H 1/0244* (2013.01); *A61H 1/0255* (2013.01); *A61H 1/0262* (2013.01); *A61H 1/0266* (2013.01); *A61H 1/0274* (2013.01); *A61H 1/0277* (2013.01); *A61H 1/0281* (2013.01); *A61H 1/0285* (2013.01); *B25J 9/0006* (2013.01); *A61H 2201/1207* (2013.01); *A61H 2201/1238* (2013.01); *A61H 2201/164* (2013.01); *A61H 2201/165* (2013.01); *A61H 2201/1614* (2013.01); *A61H 2201/1628* (2013.01); *A61H 2201/1676* (2013.01); *A61H 2201/5061* (2013.01)

(56) References Cited

U.S. PATENT DOCUMENTS

| | | | |
|---|---|---|---|
| 3,449,769 | A | 6/1969 | Mizen |
| 3,759,563 | A | 9/1973 | Kitamura |
| 4,200,596 | A | 4/1980 | Iiyama et al. |
| 4,398,110 | A | 8/1983 | Flinchbaugh et al. |
| 4,723,353 | A | 2/1988 | Monforte |
| 4,884,720 | A | 12/1989 | Whigham et al. |
| 5,144,943 | A * | 9/1992 | Luttrell ............... A61F 5/0111 601/33 |
| 5,785,505 | A | 7/1998 | Price |
| 6,641,371 | B2 | 11/2003 | Graziani et al. |
| 7,628,766 | B1 | 12/2009 | Kazerooni et al. |
| 7,883,546 | B2 | 2/2011 | Kazerooni et al. |
| 7,947,004 | B2 | 5/2011 | Kazerooni et al. |
| 8,375,982 | B2 | 2/2013 | Gray, Jr. |
| 8,435,309 | B2 | 5/2013 | Gilbert et al. |
| 8,870,967 | B2 | 10/2014 | Herr et al. |
| 9,295,604 | B2 | 3/2016 | Zoss et al. |
| 9,333,097 | B2 | 5/2016 | Herr et al. |
| 2002/0094919 | A1 | 7/2002 | Rennex et al. |
| 2005/0059908 | A1 | 3/2005 | Bogert |
| 2006/0064047 | A1 | 3/2006 | Shimada et al. |
| 2006/0069449 | A1 | 3/2006 | Bisbee, III et al. |
| 2006/0197049 | A1 | 9/2006 | Hamada et al. |
| 2007/0129653 | A1 | 6/2007 | Sugar et al. |
| 2008/0156363 | A1* | 7/2008 | Ikeuchi ............... A61H 3/00 135/65 |
| 2008/0269027 | A1* | 10/2008 | Chen ............... A61H 1/0266 482/80 |
| 2009/0036815 | A1* | 2/2009 | Ido ............... A61H 1/0237 602/23 |
| 2009/0199883 | A1* | 8/2009 | Hiki ............... A61H 1/0237 135/65 |
| 2009/0294238 | A1 | 12/2009 | Gilmore |
| 2010/0094185 | A1 | 4/2010 | Amundson et al. |
| 2010/0241242 | A1 | 9/2010 | Herr et al. |
| 2011/0040216 | A1 | 2/2011 | Herr et al. |
| 2011/0066088 | A1 | 3/2011 | Little et al. |
| 2011/0264230 | A1 | 10/2011 | Herr et al. |
| 2012/0073930 | A1 | 3/2012 | Lansberry et al. |
| 2012/0137667 | A1 | 6/2012 | Jacobsen et al. |
| 2012/0179075 | A1 | 7/2012 | Perry et al. |
| 2012/0216671 | A1 | 8/2012 | Gammon |
| 2012/0259429 | A1* | 10/2012 | Han ............... A61F 5/0127 623/24 |
| 2013/0090580 | A1* | 4/2013 | Hong ............... A61H 1/0277 601/33 |
| 2013/0192406 | A1 | 8/2013 | Godowski |
| 2013/0226048 | A1 | 8/2013 | Unluhisarcikli et al. |
| 2013/0253385 | A1 | 9/2013 | Goffer et al. |
| 2013/0296746 | A1 | 11/2013 | Herr et al. |
| 2013/0331744 | A1 | 12/2013 | Kamon |
| 2013/0333368 | A1 | 12/2013 | Durfee et al. |
| 2014/0100492 | A1 | 4/2014 | Nagasaka |
| 2014/0190289 | A1 | 7/2014 | Zhu |
| 2015/0173929 | A1 | 6/2015 | Kazerooni et al. |
| 2015/0209214 | A1* | 7/2015 | Herr ............... A61H 3/00 623/27 |
| 2015/0321342 | A1 | 11/2015 | Smith et al. |
| 2016/0153508 | A1 | 6/2016 | Battlogg |
| 2016/0331572 | A1 | 11/2016 | Popovic et al. |
| 2016/0332302 | A1 | 11/2016 | Bingham et al. |
| 2016/0332305 | A1 | 11/2016 | Gonzalez et al. |
| 2018/0298976 | A1 | 10/2018 | Battlogg |

FOREIGN PATENT DOCUMENTS

| | | |
|---|---|---|
| EP | 2198810 A1 | 6/2010 |
| EP | 2942162 A2 | 11/2015 |
| EP | 2168548 B1 | 10/2016 |
| GB | 686237 A | 1/1953 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-134985 A | 11/1977 |
| JP | S58-113586 A | 7/1983 |
| JP | S62-200600 A | 9/1987 |
| JP | H06-213266 A | 8/1994 |
| JP | H07-5129 Y2 | 2/1995 |
| JP | 2003-103480 A | 4/2003 |
| JP | 2005-118938 A | 5/2005 |
| JP | 2006-051558 A | 2/2006 |
| JP | 2007-130234 A | 5/2007 |
| JP | 2007-252514 A | 10/2007 |
| JP | 2007-307216 A | 11/2007 |
| JP | 2009-023828 A | 2/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 5267730 | 8/2013 |
| JP | 2013-248699 A | 12/2013 |
| JP | 2014-054273 A | 3/2014 |
| JP | 2014-073222 A | 4/2014 |
| JP | 2015-212010 A | 11/2015 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| WO | WO 2003/081762 A1 | 10/2003 |
| WO | WO 2010/025409 A1 | 3/2010 |
| WO | WO 2012/042471 A1 | 4/2012 |
| WO | WO 2017/148499 A1 | 9/2017 |
| WO | WO 2018-118004 A1 | 6/2018 |
| WO | WO 2018-215705 A1 | 11/2018 |

OTHER PUBLICATIONS

Elliott et al., Design of a Clutch-Spring Knee Exoskeleton for Running, Journal of Medical Devices, Sep. 2014, 11 pages, vol. 8, The American Society of Mechanical Engineers, New York City, NY.

Elliott et al., The Biomechanics and Energetics of Human Running using an Elastic Knee Exoskeleton, Jun. 2013, 7 pages, IEEE International Conference on Rehabilitation Robotics, Seattle, WA.

Jafari et al., A Novel Actuator with Adjustable Stiffness (AwAS), Oct. 18-22, 6 pages, 2010, IEEE/RSJ International Conference on Intelligent Robots and Systems, Taiwan.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, PA.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

(56) References Cited

OTHER PUBLICATIONS

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Pan, Improved Design of a Three-degree of Freedom Hip Exoskeleton Based on Biomimetic Parallel Structure, Jul. 2011, 132 pages, University of Ontario Institute of Technology, Canada.

Pratt et al., The RoboKnee: An Exoskeleton for Enhancing Strength and Endurance During Walking, International Conference on Robotics & Automation, Apr. 2004, 6 pages, IEEE, New Orleans, LA.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, CA.

Siddharth et al., Design and Analysis of a 1-DOF Walking Mechanism, http://siddharthswaminathan.in/files/WalkingMechanism.pdf, Nov. 2012, 7 pages, India.

Suitx, Phoenix Medical Exoskeleton, https://www.suitx.com/phoenix-medical-exoskeleton, 3 pages, to the best of the applicant's knowledge article was available before the application filing date of May 5, 2015, US Bionics, Inc., Berkeley, CA.

Suleiman, Engineering an affordable exoskeleton, Phys.org, https://phys.org/news/2014-06-exoskeleton.html, Jun. 12, 2014, 5 pages, Science X network.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

EP Search Report for EP Application No. 15166668.2, dated Oct. 19, 2015, 6 pages.

EP Search Report for EP Application No. 15166669.0, dated Dec. 10, 2015, 12 pages.

EP Search Report for EP Application No. 15166667.4, dated Feb. 19, 2016, 11 pages.

EP Search Report for EP Application No. 15166664.1, dated Apr. 15, 2016, 9 pages.

EP Search Report for EP Application No. 17201464.9, dated Apr. 26, 2018, 8 pages.

EP Search Report for EP Application No. 17201467.2, dated Apr. 26. 2018, 7 pages.

EP Search Report for EP Application No. 17201466.4, dated Apr. 30, 2018, 8 pages.

EP Search Report for EP Application No. 18210380.4, dated Mar. 27, 2019, 9 pages.

Hauser et al., JammJoint: A Variable Stiffness Device Based on Granular Jamming for Wearable Joint Support, IEEE Robotics and Automation Letters, Apr. 2017, 7 pages, vol. 2, Issue 2, IEEE, Piscataway, NJ.

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

EP Search Report for EP Application No. 18213196.1, dated Apr. 8, 2019, 11 pages.

* cited by examiner

FORWARD OR REARWARD ORIENTED EXOSKELETON

RELATED APPLICATION

This application claims the benefit of U.S. Provisional Application No. 61/989,521, filed May 6, 2014, which is incorporated by reference herein in its entirety.

BACKGROUND

A wide variety of exoskeleton, humanoid, and other legged robot systems exist. The fundamental technical problem to be solved for such systems, where energetic autonomy is concerned, is power. Two options are available: use a high-output power supply that can meet the demands of the robotic system, or use less power. The first option lacks practicality, inasmuch as portable power remains a challenge, which leaves the second option. Accordingly, the exoskeletons or ambulatory robots currently in existence are not capable of providing high force outputs for prolonged periods of time. In other words, the power issue has been a challenging obstacle, with the typical solution being to reduce the force output capabilities of the system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In order to improve an exoskeleton robotic system's force output and endurance capabilities with limited power available, the efficiency of such systems can be the focus of improvement. For example, in a typical exoskeleton system, support structures are located laterally beside the operator's legs. This configuration results in gravity-induced moments in the hip medial/lateral rotation and ankle medial/lateral rotation degrees of freedom that are compensated for by actuators, which use power to operate.

Accordingly, an exoskeleton is disclosed with a structural configuration that can facilitate a reduction in power over that of typical exoskeleton systems. In one aspect, an actuator for the hip medial/lateral rotation degree of freedom and/or the ankle medial/lateral rotation degree of freedom can be eliminated (or the size and power reduced), thus reducing the power requirements of the exoskeleton. The exoskeleton can include a plurality of support members rotatably coupled together about a plurality of joints defining a plurality of degrees of freedom corresponding to a degree of freedom of a human extremity. One or more of the plurality of joints can be located such that one or more parasagittal planes through the human extremity can intersect at least one of the plurality of joints to minimize a gravity-induced moment on the at least one joint during operation of the exoskeleton. In one aspect, an actuator can be associated with one or more of the plurality of joints to apply a torque to the support members.

In one aspect, a lower body exoskeleton is disclosed that can include a plurality of joints, and a plurality of support members rotatably coupled together about the plurality of joints. A first joint of the plurality joints can define a degree of freedom corresponding to a degree of freedom of a hip medial/lateral rotation or an ankle medial/lateral rotation of a human leg. A parasagittal plane through the human leg can intersect the first joint to minimize a gravity-induced moment on the first joint during operation of the exoskeleton.

In another aspect, an upper body exoskeleton is disclosed that can include a plurality of joints, and a plurality of support members rotatably coupled together about the plurality of joints. A first joint of the plurality joints can define a degree of freedom corresponding to a degree of freedom of a shoulder medial/lateral rotation or a wrist pronation/supination of a human arm. A parasagittal plane through the human arm can intersect the first joint to minimize a gravity-induced moment on the first joint during operation of the exoskeleton.

Figure 1:
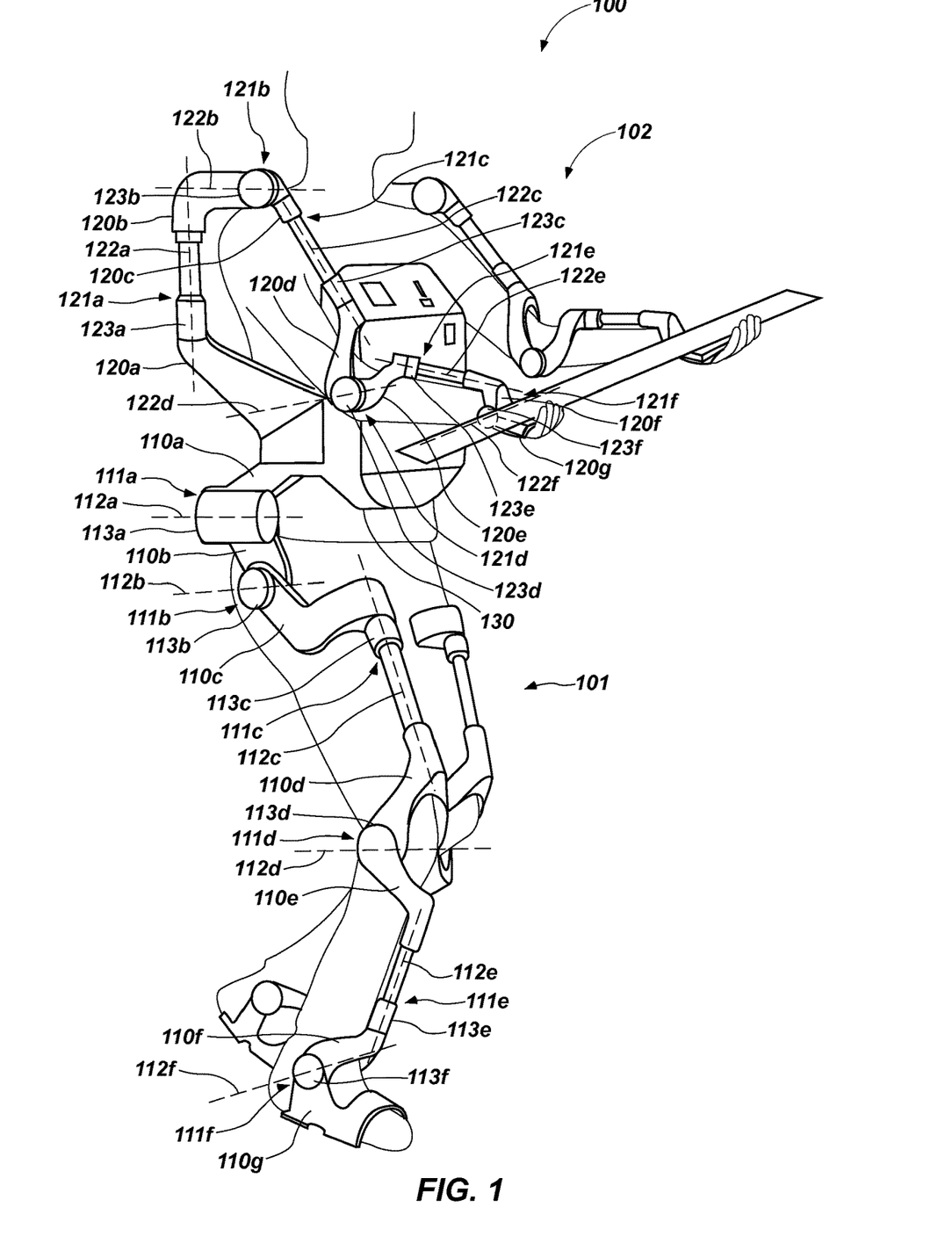
FIG. 1 is an illustration of an exoskeleton in accordance with an example of the present disclosure.

One example of an exoskeleton robotic device 100 is illustrated in FIG. 1. The exoskeleton 100 can comprise any suitable configuration in accordance with the concepts discussed herein. An exoskeleton as disclosed herein can be configured as a full-body exoskeleton (i.e., similar to the exoskeleton 100 having both a lower body portion 101 and upper body portion 102), as only a lower body exoskeleton (i.e., some or all of the lower body portion 101), or as only an upper body exoskeleton (i.e., some or all of the upper body portion 102). In one example, as illustrated in the figure, the exoskeleton 100 can comprise a plurality of lower body support members 110a-g and a plurality of upper body support members 120a-g. The support members can be coupled together for relative movement about a plurality of joints defining a plurality of degrees of freedom. For example, the lower body support members 110a-g can be rotatably coupled together about joints 111a-f defining rotational degrees of freedom about one or more axes 112a-f, although translational degrees of freedom are possible. The upper body support members 120a-g can be rotatably coupled together about joints 121a-f defining rotational degrees of freedom about one or more axes 122a-f, although translational degrees of freedom are possible. In one aspect, a joint can accommodate any suitable number of degrees of freedom. Thus, although the joints illustrated in the figure each define a single degree of freedom, it is possible for a single joint to define multiple degrees of freedom (i.e., by a universal or ball joint). Such single or multi-degree of freedom joints can be provided at any suitable location of the exoskeleton 100.

One or more of the degrees of freedom, such as the rotational degrees of freedom about the axes 112a-f, 122a-f, can correspond to one or more degrees of freedom of a human leg or a human arm, respectively. For example, the rotational degrees of freedom about the axes 112a-f can correspond to hip abduction/adduction, hip flexion/extension, hip medial/lateral rotation, knee flexion/extension, ankle medial/lateral rotation, and ankle flexion/extension, respectively. A degree of freedom corresponding to ankle inversion/eversion can also be included, as desired. In addition, the rotational degrees of freedom about the axes 122a-f can correspond to shoulder abduction/adduction, shoulder flexion/extension, shoulder medial/lateral rotation, elbow flexion/extension, wrist pronation/supination, and wrist flexion/extension, respectively. A degree of freedom corresponding to wrist abduction/adduction can also be included, as desired.

A human user or operator may use or interact with the exoskeleton robotic device 100 by placing his or her feet into a foot portion of the device, where the feet of the operator can be in contact with a corresponding force sensor. Portions of the human operator can also be in contact with force sensors disposed on various locations of the exoskeleton 100. For example, a hip portion or a shoulder portion of the exoskeleton 100 can have a force sensor configured to interact with the operator's hip or shoulder, respectively. The operator can be coupled to the exoskeleton 100 by a waist strap, shoulder strap or other appropriate coupling device. The operator can be further coupled to the exoskeleton 100 by a foot strap and/or a handle for the operator to grasp. In one aspect, a force sensor can be located about a knee portion or an elbow portion of the exoskeleton 100 near a knee or a shoulder, respectively, of the operator. While reference is made to force sensors disposed at specific locations on or about the exoskeleton 100, it should be understood that force sensors can be strategically placed at numerous locations on or about the exoskeleton 100 in order to facilitate proper operation of the exoskeleton 100.

In general, actuators can be associated with various degrees of freedom of the exoskeleton to provide forces or torques to the support members in the respective degrees of freedom. Unlike traditional exoskeleton systems and devices, the exoskeleton 100 can be configured such that certain degrees of freedom corresponding to those of a human operator can be provided with little or no actuation (i.e., force or torque), which can reduce complexity and power consumption of the exoskeleton 100. For example, with respect to the lower body structures of the exoskeleton 100, the joint 111c, which defines a degree of freedom corresponding to a degree of freedom of hip medial/lateral rotation, can be located relative to the human operator such that a parasagittal plane through the human leg intersects the joint 111c. This is explained in more detail below.

The reason for locating the joint 111c in such a manner is to minimize or reduce a moment on the joint 111c that is induced by the exoskeleton 100 and that can occur when the operator is maneuvering the exoskeleton 100, such as when walking. On the other hand, when an operator causes a prior exoskeleton to lift and extend a leg to walk, exoskeletal structure (e.g., support members, joints, actuators, etc.) located medially or laterally of the operator's leg can create a moment about a joint corresponding to hip medial/lateral rotation of the operator, due to the weight of the laterally offset exoskeletal structure. Thus, in prior exoskeletons, a large actuator is needed to counteract or compensate for the gravity-induced moment, so that the operator does not feel the effects of the induced moment, which may be more than the operator can comfortably handle. By locating the joint 111c of the example exoskeleton 100, as well as other lower body portion 101 structures of the exoskeleton 100 (e.g., structures distally located relative to the joint 111c), in the position shown, which reduces or minimizes the induced moment, little or no actuation of the joint 111c may be needed to address the effects of such a moment. The joint 111e (ankle medial/lateral rotation), the joint 121c (shoulder medial/lateral rotation), and the joint 121e (wrist pronation/supination rotation) can similarly benefit from reduced or minimized moments induced during operation of the exoskeleton 100 and may therefore also benefit by being located such that a parasagittal plane through the respective extremity intersects the joint.

Figure 2A:
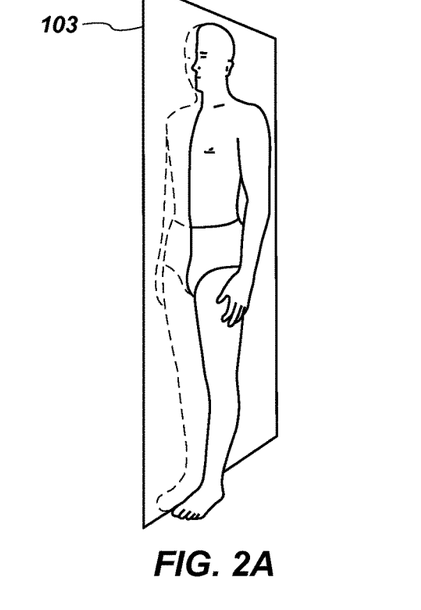
FIG. 2A illustrates a sagittal plane of a human body.
Figure 2B:
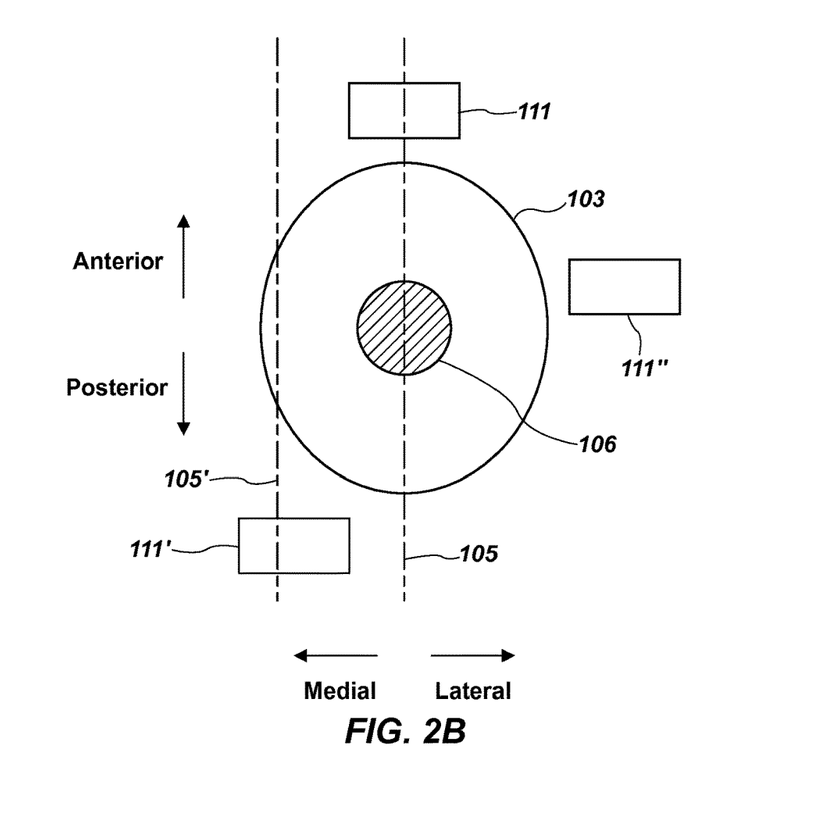
FIG. 2B is a schematic cross-section of a human extremity, illustrating joints of the exoskeleton of FIG. 1 located relative to the extremity, in accordance with an example of the present disclosure.

FIG. 2A illustrates a sagittal plane 103 of a human body. A parasagittal plane is parallel to the sagittal plane, but laterally offset from the sagittal plane to either side. Thus, as illustrated in FIG. 2B, which shows a schematic cross-section of a human extremity 104 (i.e., a leg or an arm), a joint 111 of the exoskeleton 100 can be located relative to the extremity 104, such that a parasagittal plane 105 through the extremity 104 intersects the joint 111, which can locate the joint 111 in a forward (or rearward) alignment with the bone 106 and joint of the extremity 104. A parasagittal plane can intersect the extremity 104 at any location. For example, a parasagittal plane 105' can extend through a medial side of the extremity 104 and intersect a joint 111'. The same is true for a parasagittal plane (not shown) extending through a lateral side of the extremity 104. Thus, a joint of the exoskeleton 100 can be located in any position about the extremity 104 such that a parasagittal plane extending through the extremity 104 intersects the joint. With a joint thus located, an induced moment, as discussed above, can be reduced or minimized sufficiently, such that little or no actuation of the joint may be needed. In one aspect, the joint 111 can be substantially aligned with a bone 106 (i.e., a structural member) of the extremity 104 along the parasagittal plane 105. Such an alignment may result in the minimum moment induced by the exoskeletal structure, as discussed above. In another aspect, a joint can be located in an anterior position (forward oriented) or a posterior position (rearward oriented) relative to the extremity 104. For example, the joint 111 is located in an anterior position (in front or forward oriented) relative to the extremity 104 and the joint 111' is located in a posterior position (in back or rearward oriented) relative to the extremity 104.

Although it is possible to locate all joints of the exoskeleton 100 in a forward or a rearward oriented position relative to an extremity, this need not be the case. As shown in FIG. 2B, other joint positions relative to the extremity 104 are possible. For example, the joint 111" is shown laterally located relative to the extremity 104. A joint (not shown) may also be medially located relative to the extremity 104. As described further below, certain joints of the exoskeleton may be effectively utilized at such locations.

With further reference to FIG. 1, it can be seen that the joint 111c for hip medial/lateral rotation is located in front of the operator's leg. Similarly, the joint 111e (ankle medial/lateral rotation), the joint 121c (shoulder medial/lateral rotation), and the joint 121e (wrist pronation/supination rotation) are located in front of the respective extremities of the operator. In a related aspect, a support member 110a-g, 120a-g can be located substantially in a forward oriented or rearward oriented position relative to the respective extremity. For example, the support members 110d-f are located substantially in a forward oriented position relative to the leg, and support members 120c-g are located substantially in a forward oriented position relative to the arm. In another related aspect, at least a portion of a support member 110a-g, 120a-g can be located in a forward oriented or rearward oriented position relative to the human leg or arm. For example, the support member 110c is located substantially in a forward oriented position relative to the leg, and support member 120b is located substantially in a forward oriented position relative to the arm. In yet another related aspect, at least one of the support members associated with the joint 111c, 111e, 121c, 121e can extend between the joint 111c, 111e, 121c, 121e and another joint located in a medially and/or a laterally oriented position relative to the extremity. For example, the support member 110c is associated with the joint 111c and extends between the joint 111c and the joint 111b, which is in a laterally located position relative to the leg. Thus, the support member 110c extends around the leg from a forward oriented position to a laterally oriented position. The support member 110d is also associated with the joint 111c and extends between the joint 111c and the joint 111d, which is in both medially and laterally located positions relative to the leg, as portions of the joint 111d are disposed on opposite sides of the knee. Thus, the support member 110d extends around the leg from a forward oriented position to medially and laterally oriented positions. Locating portions of the support members 110d, 110e and the joint 111d on opposite sides of the knee can serve to balance the mass about the leg, thus reducing or minimizing a gravity-induced moment that may be created due to these exoskeletal structures. The same principle applies for other locations and degrees of freedom, such as the joint 111e (ankle medial/lateral rotation), the joint 121c (shoulder medial/lateral rotation), and the joint 121e (wrist pronation/supination rotation).

The exoskeleton 100 can also comprise one or more actuators 113a-f, 123a-f to apply a force or a torque to the support members 110a-g, 120a-g in the degrees of freedom, such as any of the rotational degrees of freedom about the axes 112a-f, 122a-f. For example, as illustrated in FIG. 1, with respect to the lower body portion 101, the actuator 113a can apply a force or a torque to the support members 110a, 110b in the degree of freedom about the axis 112a. The actuator 113b can apply a force or a torque to the support members 110b, 110c in the degree of freedom about the axis 112b. The actuator 113c can apply a force or a torque to the support members 110c, 110d in the degree of freedom about the axis 112c. The actuator 113d can apply a force or a torque to the support members 110d, 110e in the degree of freedom about the axis 112d. The actuator 113e can apply a force or a torque to the support members 110e, 110f in the degree of freedom about the axis 112e. The actuator 113f can apply a force or a torque to the support members 110f, 110g in the degree of freedom about the axis 112f.

Similarly, with respect to the upper body portion 102, the actuator 123a can apply a force or a torque to the support members 120a, 120b in the degree of freedom about the axis 122a. The actuator 123b can apply a force or a torque to the support members 120b, 120c in the degree of freedom about the axis 122b. The actuator 123c can apply a force or a torque to the support members 120c, 120d in the degree of freedom about the axis 122c. The actuator 123d can apply a force or a torque to the support members 120d, 120e in the degree of freedom about the axis 122d. The actuator 123e can apply a force or a torque to the support members 120e, 120f in the degree of freedom about the axis 122e. The actuator 123f can apply a force or a torque to the support members 120f, 120g in the degree of freedom about the axis 122f.

The actuators 113a-f, 123a-f can comprise any suitable actuator, such as a hydraulic actuator, a pneumatic actuator, and/or an electric actuator. In one aspect, an actuator can be remotely located relative to the joint or degree of freedom in which the actuator will provide force or torque. For example, an actuator for an ankle degree of freedom can be located on a support member near a pelvis or thigh of the user, and can have a power transfer mechanism, such as a cable routed through a neutral axis of an intermediated degree of freedom (e.g., knee flexion/extension), to remotely actuate the ankle degree of freedom. Such a configuration can locate the mass of the actuator near a center of rotation (i.e., the hip) to reduce the rotating mass of an exoskeleton robotic device.

Although the exoskeleton 100 has been illustrated with actuators for every joint that corresponds to a degree of freedom of an extremity, it should be recognized that not every such joint need have a actuator, or the same size of actuator, as this is one of the benefits provided by the present technology. In other words, some joints may be powered. In addition, other joints may be non-powered or powered at a lower amount (and therefore producing a lower torque) than that of a powered actuator associated with a joint that defines a degree of freedom corresponding to a degree of freedom of a flexion/extension rotation. This is made possible as the forward or rearward oriented position of these joints facilitates movement in their respective degrees of freedom under human power by an operator (or slightly assisted in the example of a low powered actuator scenario), thus reducing or minimizing the number of powered actuators (or reducing their size) that are provided with an exoskeleton. For example, for the lower body portion 101, the joint 111c and/or the joint 111e may be non-powered joints. Due to the location of these joints in a forward oriented position relative to the user, as described above, the gravity-induced moments will be minimal, such that the operator can resist these moments and actuate the degree of freedom using his/her own muscles and bones. In addition, the movements provided by the hip medial/lateral rotation and the ankle medial/lateral rotation degrees of freedom do not typically need amplification by an actuator. Thus, actuators for these degrees of freedom can be eliminated, or significantly reduced in size compared to prior actuators for these degrees of freedom, and even those actuators in the current exoskeleton designs used to power flexion/extension degrees of freedom. Indeed, if an actuator is used for one of these degrees of freedom, the actuator can be small, and one that utilizes less power and that produces less torque, thereby providing a power savings over such larger actuators. This principle is applicable to those degrees of freedom described herein, such as those corresponding to a degree of freedom of one of a hip medial/lateral rotation and an ankle medial/lateral rotation of a human leg, or those corresponding to a degree of freedom of one of a shoulder medial/lateral rotation and a wrist pronation/supination of a human arm.

Similarly, for the upper body portion 102, the joint 121c and/or the joint 121e may be non-powered or reduced power joints. Due to the location of these joints in a forward oriented position relative to the user, as described above, the gravity-induced moments will be minimal, such that the operator can resist these moments using his/her own muscles and bones. In addition, the movements provided by the shoulder medial/lateral rotation and the wrist pronation/supination rotation degrees of freedom do not typically need amplification by an actuator. Thus, actuators for these degrees of freedom can be eliminated, or significantly reduced in size compared to prior actuators for these degrees of freedom. If an actuator is used for one of these degrees of freedom, the actuator can be small, thereby providing a power savings over a larger actuator that would be used in a prior exoskeleton design.

Reducing the number of actuators in the exoskeleton 100 can also reduce the distal weight in the extremities, thereby, making the exoskeleton more efficient and easier for the operator to use.

In one aspect, a biasing mechanism can serve as a substitute for an actuator for a non-powered or low-powered joint. For example, a biasing mechanism, such as a spring, can be associated with a non-powered joint to bias the support members associated with the non-powered or low-powered joint to a neutral or centered position. This can maintain a proper orientation of a foot when walking, as medial/lateral rotation of the hip may occur while the operator is taking a step forward. The biasing mechanism can function to return the foot to a proper or correct alignment as the operator walks. A biasing mechanism can be similarly utilized at any non-powered or low-powered joint.

Although minimizing the gravity-induced moments on the joint 111c (hip medial/lateral rotation), the joint 111e (ankle medial/lateral rotation), the joint 121c (shoulder medial/lateral rotation), and/or the joint 121e (wrist pronation/supination rotation) can provide significant power-saving benefits for the exoskeleton 100, doing so with other exoskeleton joints, may not provide the same type of benefits. For example, in FIG. 1, the joint 111a (hip adduction/abduction) and the joint 111b (hip flexion/extension) are laterally located relative to the leg. Such locations for these joints and associated support members does not contribute to the gravity-induced moments on the more distally located joints 111c, 111e. In addition, the gravity-induced moments for these joints are either reacted by the opposite leg or are easily handled by a suitably sized actuator. Because these joints are typically actuated, due to the desirability of amplifying the movement associated with their degrees of freedom, there may not be a benefit to eliminating the associated actuators 113, 113b from the exoskeleton 100.

Although the location of the joint 111d (knee flexion/extension) can influence the gravity induced moments on the joint 111c, by being distally located relative to the joint 111c, such gravity-induced moments can be minimized by locating the joint structure on opposite sides of the knee, as discussed above and shown in the drawings. Similar principles apply to the joints of the upper body portion 102. Nonetheless, it should be recognized that any joint of the exoskeleton 100 can be located in a forward or a rearward orientation.

In one aspect, the exoskeleton 100 can include a support structure 130 from which the support members 110a-g, 120a-g extend. The support structure 130 can be located substantially in a forward oriented (as shown) or a rearward oriented position relative to the operator. The support structure 130 can serve to couple the lower body portion 101 and the upper body portion 102 to one another. In addition, the support structure 130 can house exoskeleton electronics (e.g., a processor, a communication device, etc.) a power source, etc. By locating the support structure in front of the operator, along with many of the support members, as shown, the exoskeletal structure can inherently provide a protective barrier for the operator. This configuration can also support dedicated protective gear to provide even more frontal protection for the operator.

Figures 3A, 3B:
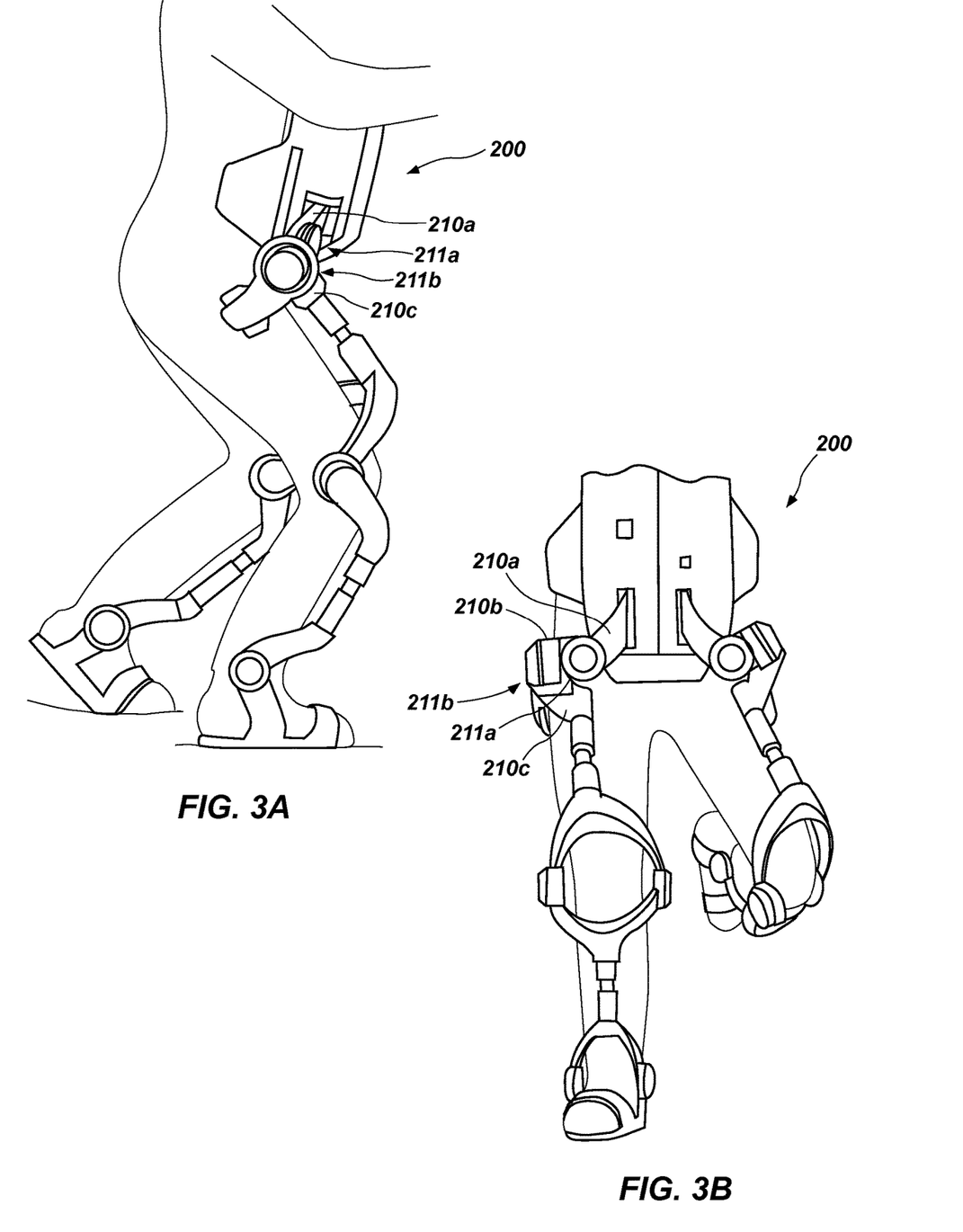
FIGS. 3A and 3B are illustrations of an exoskeleton in accordance with another example of the present disclosure.

FIGS. 3A and 3B illustrate an exoskeleton 200 in accordance with another example of the present disclosure. Similar to the exoskeleton 100 of FIG. 1 discussed above, the exoskeleton 200 includes support members 210a-c that are coupled together to form joints 211a-b, which define degrees of freedom corresponding to hip adduction/abduction and hip flexion/extension, respectively. In this case, the joints 211a-b are in a forward oriented location relative to the operator's leg, such that a parasagittal plane through the leg intersects the joints 211a-b. In this configuration, the operator can "shadow" the exoskeleton 200, in that the exoskeleton is substantially located in front of the operator, while controlling the exoskeleton's movements.

Figure 4A:
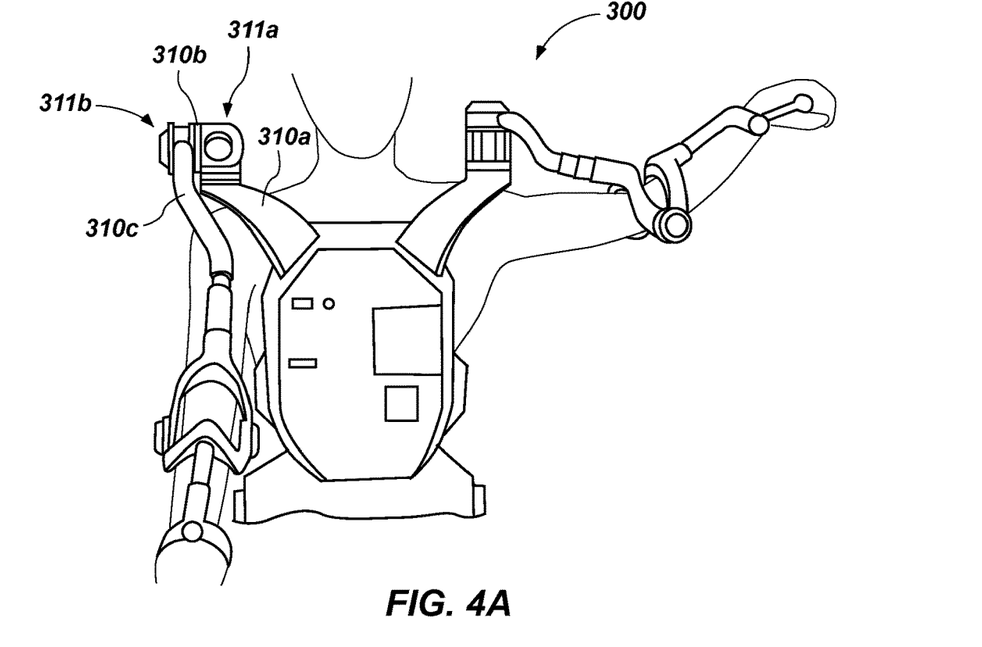
FIGS. 4A and 4B are illustrations of an exoskeleton in accordance with yet another example of the present disclosure.
Figure 4B:
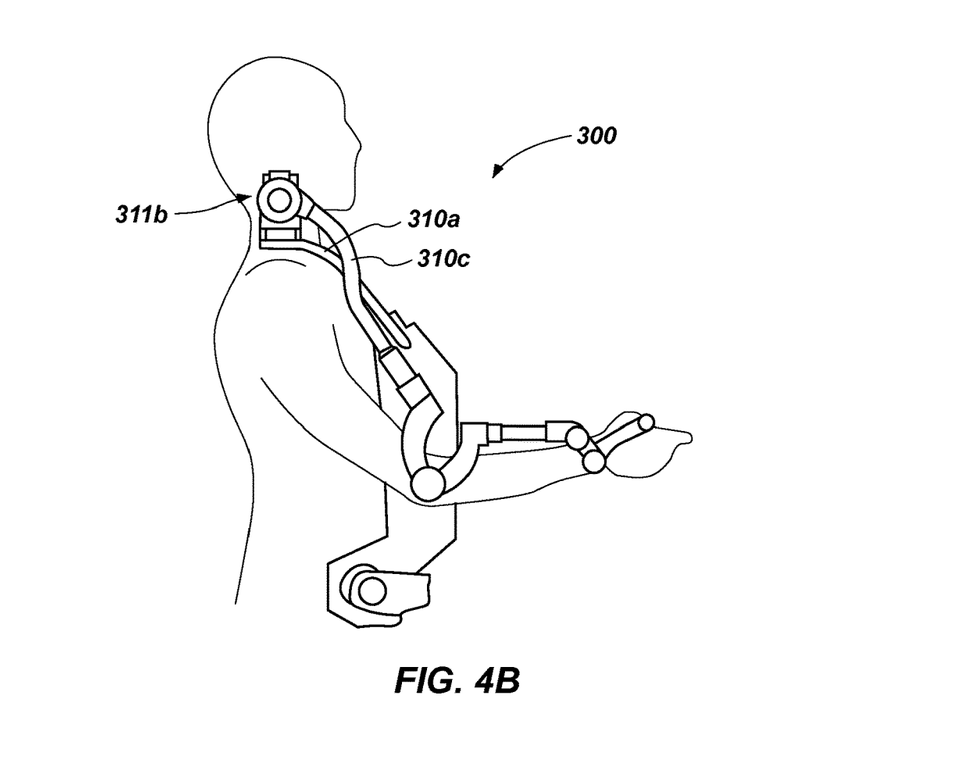

FIGS. 4A and 4B illustrate an exoskeleton 300 in accordance with yet another example of the present disclosure. Similar to the exoskeleton 100 of FIG. 1 discussed above, the exoskeleton 300 includes support members 310a-c that are coupled together to form joints 311a-b, which define degrees of freedom corresponding to shoulder adduction/abduction and shoulder flexion/extension, respectively. As shown in FIGS. 4A and 4B, the joint 311a is in a location relative to the operator's arm, such that a parasagittal plane through the arm intersects the joint 311a. Although the joint 311b may be located slightly to a lateral side of the arm, such as location is not an issue with regard to induced moments for the reasons discussed above. This configuration also represents a forward oriented exoskeleton in that the exoskeleton 300 is substantially located in front of the operator.

Figure 5A:
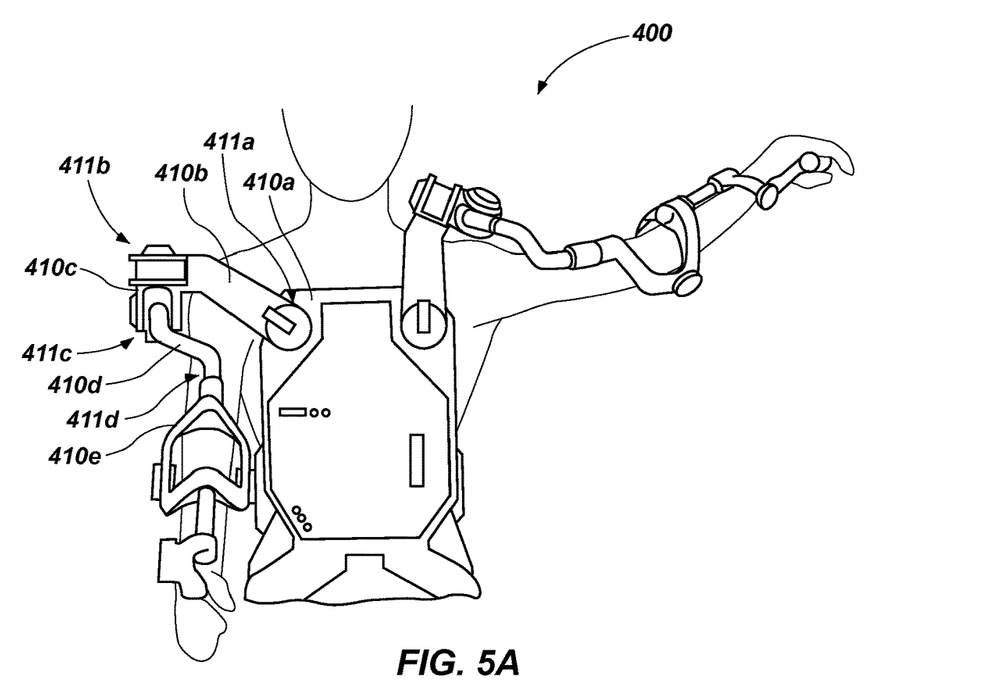
FIGS. 5A and 5B are illustrations of an exoskeleton in accordance with still another example of the present disclosure.
Figure 5B:
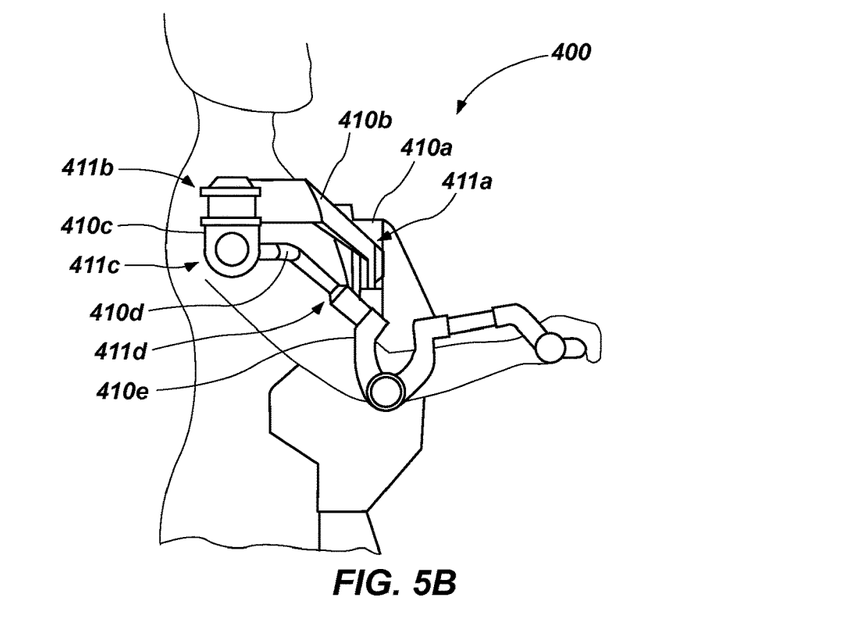

FIGS. 5A and 5B illustrate an exoskeleton 400 in accordance with still another example of the present disclosure. The exoskeleton 400 includes support members 410b-e that are coupled together to form joints 411b-d, which define degrees of freedom corresponding to shoulder adduction/abduction, shoulder flexion/extension, and shoulder medial/lateral rotation, respectively. In this case, the support members 410a-b are coupled together to form a joint 411a, which defines a degree of freedom corresponding to shoulder shrug. Thus, in this example, a fourth shoulder degree of freedom is provided. This configuration also represents a forward oriented exoskeleton in that the exoskeleton 400 is substantially located in front of the operator.

In accordance with one embodiment of the present invention, a method is disclosed for facilitating use of a lower body exoskeleton with little or no actuation for a degree of freedom corresponding to a degree of freedom of a hip medial/lateral rotation or an ankle medial/lateral rotation of a human leg. The method can comprise providing a lower body exoskeleton including a plurality of joints, and a plurality of support members rotatably coupled together about the plurality of joints, wherein a first joint of the plurality joints defines a degree of freedom corresponding to a degree of freedom of one of a hip medial/lateral rotation and an ankle medial/lateral rotation of a human leg. Additionally, the method can comprise locating the first joint such that a parasagittal plane through the human leg intersects the first joint to minimize a gravity-induced moment on the first joint during operation of the exoskeleton. In one aspect of the method, at least a portion of at least one of the support members associated with the first joint is located in a forward oriented or rearward oriented position relative to the human leg. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A lower body exoskeleton, comprising:
a first joint defining a degree of freedom corresponding to a degree of freedom of a hip medial/lateral rotation of a human leg; and
first and second support members rotatably coupled together about the first joint,
wherein the first joint is positionable about a human leg such that a parasagittal plane that extends through the human leg intersects the first joint and a portion of each of the first and second support members, such that the first joint is positionable in at least one of a forward oriented or a rearward oriented position relative to the human leg to minimize a gravity-induced moment on the first joint during operation of the exoskeleton.

2. The lower body exoskeleton of claim 1, wherein at least a portion of at least one of the first or second support members associated with the first joint is adapted to be located in at least one of a forward oriented or a rearward oriented position relative to the human leg.

3. The lower body exoskeleton of claim 1, wherein the first joint is a non-powered joint and moveable under power by an operator.

4. The lower body exoskeleton of claim 3, further comprising a biasing mechanism comprising a spring operatively coupled to at least one of the first or second support members to bias the first and second support members associated with the first joint to a neutral position.

5. The lower body exoskeleton of claim 1, wherein the first joint is a powered joint, and wherein an actuator associated with the first joint functions to apply a torque to the first and second support members associated with the first joint.

6. The lower body exoskeleton of claim 5, wherein the first joint is a low-powered joint, and wherein the actuator associated with the first joint is a low powered actuator that operates at less power and that applies less torque than that of a powered actuator associated with a joint of the lower body exoskeleton that defines a degree of freedom corresponding to a degree of freedom of a flexion/extension rotation.

7. The lower body exoskeleton of claim 1, wherein at least one of the first or second support members associated with the first joint extends between the first joint and a second joint adapted to be located in at least one of a medially and laterally oriented position relative to the human leg, wherein the at least one of the first or second support members is adapted to extend around the human leg from at least one of a forward or a rearward oriented positon to at least one of the medially and laterally oriented position.

8. The lower body exoskeleton of claim 1, further comprising a second joint that defines a degree of freedom corresponding to an ankle medial/lateral rotation of the human leg, and wherein the second joint is positionable about the human leg such that the parasagittal plane through the human leg intersects the second joint.

9. The lower body exoskeleton of claim 8, wherein the second joint is a non-powered joint and moveable under power by an operator.

10. The lower body exoskeleton of claim 1, further comprising a second joint that defines a degree of freedom corresponding to a degree of freedom of at least one of hip flexion/extension and hip abduction/adduction.

11. The lower body exoskeleton of claim 1, further comprising a second joint that define a degree of freedom corresponding to a degree of freedom of knee flexion/extension.

12. The lower body exoskeleton of claim 1, further comprising a second joint that defines a degree of freedom corresponding to a degree of freedom of an ankle flexion/extension rotation.

13. The lower body exoskeleton of claim 1, further comprising a support structure from which the first and second support members extend, wherein the support structure is adapted to be located substantially in at least one of a forward oriented or a rearward oriented position relative to a human operator.

14. An upper body exoskeleton, comprising:
a first joint defining a degree of freedom corresponding to a degree of freedom of a shoulder medial/lateral rotation of a human arm; and
first and second support members rotatably coupled together about and defining the first joint,
wherein the first joint is positionable about a human arm such that a parasagittal plane through the human arm intersects the first joint and a portion of each of the first and second support members to minimize a gravity-induced moment on the first joint during operation of the exoskeleton.

15. The upper body exoskeleton of claim 14, wherein at least a portion of at least one of the first or second support members associated with the first joint is adapted to be located in at least one of a forward oriented or a rearward oriented position relative to the human arm.

16. The upper body exoskeleton of claim 14, wherein at least one of the first or second support members associated with the first joint extends between the first joint and a second joint adapted to be located in at least one of a medially and laterally oriented position relative to the human arm, wherein the at least one of the first or second support members is adapted to extend around the human arm from at least one of a forward or a rearward oriented positon to at least one of the medially and laterally oriented position.

17. The upper body exoskeleton of claim 14, further comprising a second joint that defines a degree of freedom corresponding to a wrist pronation/supination rotation of the human arm, and wherein the second joint is positionable about the human arm such that the parasagittal plane through the human arm intersects the second joint.

18. The upper body exoskeleton of claim 14, further comprising a second joint that defines a degree of freedom corresponding to a degree of freedom of at least one of shoulder flexion/extension and shoulder abduction/adduction.

19. The upper body exoskeleton of claim 14, further comprising a second joint that defines a degree of freedom corresponding to a degree of freedom of elbow flexion/extension.

20. The upper body exoskeleton of claim 14, further comprising a support structure from which the first and second support members extend, wherein the support structure is adapted to be located substantially in at least one of a forward oriented or a rearward oriented position relative to a human operator.

21. An exoskeleton, comprising:
first and second joints, each defining a degree of freedom corresponding to a degree of freedom of a joint of a human extremity; and
a plurality of support members associated with each of the first and second joints, respectively,
an actuator associated with at least one of the first or second joints to apply a torque to the support members associated with the respective one of the first or second joints,
wherein the first joint and the second joint are positionable about the human extremity such that one or more parasagittal planes through the human extremity intersects the first joint and the second joint, and a portion of each of the support members associated with the first and second joints, such that the first and second joints are positionable in at least one of a forward or a rearward oriented position relative to the human extremity to minimize a gravity-induced moment on each of the first and second joints during operation of the exoskeleton.

22. The exoskeleton of claim 21, wherein the degree of freedom defined by each of the respective first and second joints corresponds to a degree of freedom of at least one of hip adduction/abduction, hip medial/lateral rotation, ankle inversion/eversion, ankle medial/lateral rotation, shoulder medial/lateral rotation, wrist adduction/abduction, or wrist pronation/supination of the human extremity.

23. The exoskeleton of claim 21, wherein the first and second joints are adapted to be located in a forward oriented position relative to the human extremity.

24. The exoskeleton of claim 21, wherein at least one of the first or second support members is adapted to be located substantially in at least one of a forward oriented or a rearward oriented position relative to the extremity.

25. The exoskeleton of claim 21, wherein the actuator is associated with at least one of the first or second joints defining a degree of freedom corresponding to a degree of freedom of at least one of hip flexion/extension, knee flexion/extension, ankle flexion/extension, shoulder flexion/extension, shoulder adduction/abduction, elbow flexion/extension, or wrist flexion/extension of the human extremity.

26. The exoskeleton of claim 21, further comprising a support structure from which the first and second support members extend, wherein the support structure is adapted to be located substantially in at least one of a forward oriented or a rearward oriented position relative to a human operator.

27. A method for facilitating use of a lower body exoskeleton with little or no actuation for a degree of freedom corresponding to at least one of a degree of freedom of a hip medial/lateral rotation or an ankle medial/lateral rotation of a human leg, the method comprising:
providing a lower body exoskeleton including
a first joint defining a degree of freedom corresponding to a degree of freedom of a hip medial/lateral rotation of a human leg, and
first and second support members rotatably coupled together about the first joint,
a second joint defining a degree of freedom corresponding to a degree of freedom of an ankle medial/lateral rotation, and
third and fourth support members rotatably coupled together about the second joint; and locating a portion of at least one of the first, second, third, and fourth support members and the first joint and the second joint in at least one of a forward oriented or a rearward oriented position relative to the human leg such that, when the lower body exoskeleton is worn by a wearer, a parasagittal plane through the human leg intersects the first joint and the second joint to minimize a gravity-induced moment on each of the first joint and the second joint during operation of the exoskeleton.

28. The method of claim 27, wherein at least a portion of at least one of the first or second support members associated with the first joint is adapted to be located in at least one of a forward oriented or a rearward oriented position relative to the human leg.

29. A lower body exoskeleton, comprising:

a first joint defining a degree of freedom corresponding to a degree of freedom of a hip medial/lateral rotation of a human leg;

first and second support members rotatably coupled together about the first joint;

a second joint defining a degree of freedom corresponding to a degree of freedom of an ankle medial/lateral rotation of the human leg;

third and fourth support members rotatably coupled together about the second joint, and wherein the first joint and the second joint are positionable about a human leg, such that a parasagittal plane through the human leg intersects the first joint and the second joint, and a portion of each of the first, second, third, and fourth support members, such that the first joint and the second joint are each positionable in at least one of a forward oriented or a rearward oriented position relative to the human leg, to minimize a gravity-induced moment on each of the first joint and the second joint during operation of the exoskeleton.

* * * * *